(12) United States Patent
Lee et al.

(10) Patent No.: US 8,758,714 B2
(45) Date of Patent: Jun. 24, 2014

(54) ADSORBENTS FOR RADIOISOTOPES, PREPARATION METHOD THEREOF, AND RADIOISOTOPE GENERATORS USING THE SAME

(75) Inventors: Jun Sig Lee, Daejeon (KR); Hyon Soo Han, Daejeon (KR); Ul Jae Park, Daejeon (KR); Kwang Jae Son, Daejeon (KR); Hyeon Young Shin, Daejeon (KR); Soon Bog Hong, Daejeon (KR); Kang Duk Jang, Daejeon (KR); Jong Sub Lee, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 5 days.

(21) Appl. No.: 13/491,221

(22) Filed: Jun. 7, 2012

(65) Prior Publication Data

US 2012/0244055 A1    Sep. 27, 2012

Related U.S. Application Data

(60) Continuation of application No. 12/813,661, filed on Jun. 11, 2010, now abandoned, which is a division of application No. 12/117,353, filed on May 8, 2008, now abandoned.

(51) Int. Cl.
*C01G 47/00* (2006.01)
*B01J 20/06* (2006.01)

(52) U.S. Cl.
USPC .......................................................... 423/249

(58) Field of Classification Search
CPC ...................................................... C01G 47/00
See application file for complete search history.

(56) References Cited

U.S. PATENT DOCUMENTS

2004/0009873 A1    1/2004    Dong et al.

FOREIGN PATENT DOCUMENTS

| JP | 1996-309182 | 11/1996 |
|---|---|---|
| KR | 1020060017047 | 2/2006 |
| KR | 100755933 | 8/2007 |
| WO | 01/53205 | 7/2001 |

OTHER PUBLICATIONS

Callahan et al. NUC-Compact, 20, 1989, 3-6.*
Lee, et al. "Column Behavior of Molybdate . . . ", Transaction of the Korean Nuclear Society Spring Meeting, Jeju, Korea, May 10-11, 2007.
Lee et al., "Applicability of Sol-Gel Derived Adsorbent . . . ", Transaction of the Korean Nuclear Society spring Meeting, Jeju, Korea, May 10-11, 2007.
Lee et al. "Demonstration Study . . . ", Transaction of the Korean Nuclear Society Autumn Meeting, Pyeong Chang, Korea, Oct. 25-26, 2007.
Lee, et al., "Surface-modified alumina as a high capacity material of 99Mo/99mTc generator column.", #329d-Poster Session: Fundamentals and Applications of Adsorption and Ion Exchange, 2007.
Mizaeva, et al., Uzbekskii Khimicheskii Zhumal, 1991, 6, 21-4.
Bokhimi, et al. J. Phys. Chem. C 2007, 111, 103-107, Published on Web Dec. 14, 2006.
Sanchez-Valente, et al. Langmuir, 2003, 19, 3583-3588.

* cited by examiner

*Primary Examiner* — Yun Qian
(74) *Attorney, Agent, or Firm* — Lucas & Mercanti, LLP

(57) ABSTRACT

Disclosed is a novel adsorbent for use in a $^{99}$Mo/$^{99m}$Tc generator, which is a medical diagnostic radioisotope generator, and in a $^{188}$W/$^{188}$Re generator, which is a therapeutic radioisotope generator. The adsorbent composed of sulfated alumina or alumina-sulfated zirconia exhibits adsorption capacity superior to that of conventional adsorbents, and is stable and is thus loaded in a dry state in an adsorption column so that the radioisotope $^{99}$Mo or $^{188}$W can be adsorbed. Thus, it is possible to miniaturize the column, and such a miniaturized column is small, convenient to use, and highly efficient, and extracts a radioisotope satisfying the requirements for pharmaceuticals, and thus can be useful for radioisotope generators extracting $^{99m}$Tc or $^{188}$Re.

12 Claims, 10 Drawing Sheets

ADSORBENTS FOR RADIOISOTOPES, PREPARATION METHOD THEREOF, AND RADIOISOTOPE GENERATORS USING THE SAME

CROSS-REFERENCE TO RELATED APPLICATIONS

This is a continuation of U.S. patent application Ser. No. 12/813,661 filed on Jun. 11, 2010, pending, which is a divisional of U.S. patent application Ser. No. 12/117,353 filed May 8, 2008, abandoned, the entire contents of each of which are incorporated herein by reference.

BACKGROUND OF THE INVENTION

1. Field of the Invention

The present invention relates to a novel adsorbent for use in a $^{99}$Mo/$^{99m}$Tc generator, which is a medical diagnostic, radioisotope generator, and in a $^{188}$W/$^{188}$Re generator, which is a therapeutic radioisotope generator.

2. Description of the Related Art

Technetium-99m ($^{99m}$Tc), which is a very important radioisotope in the medical field, has been used for various types of medical diagnosis. $^{99m}$Tc, acting as a γ-ray emitter having a half life of 6 hours, is the daughter radionuclide of molybdenum-99 ($^{99}$Mo), which is produced through neutron absorption or fission of molybdenum-98 ($^{98}$Mo), and is useful for medical diagnosis of incurable diseases, such as cancers and cardiac diseases.

In addition to the diagnostic use, recently, as an interest is taken on therapeutic radiopharmaceuticals, $^{188}$Re is receiving attention as an attractive therapeutic nuclide.

$^{188}$Re is used for various therapeutic purposes including radioimmunotherapy, synovectomy, and bone pain palliation, and is produced through the decay of the parent nuclide $^{188}$W (half life: 69 days), and may be easily obtained in a carrier-free form from a $^{188}$W/$^{188}$Re generator. $^{188}$Re has a half life of 16.9 hours and is decayed with β particles, and the β particles have average energy of 764 keV ($E_{max}$=2.11 MeV) and emit γ rays (15%) of 155 keV. Therefore, $^{188}$Re is advantageous in that an image representing the biodistribution of a compound labeled therewith may be obtained, and pharmacokinetics or uptake quantity in target organs and dosimetry may also be estimated.

Such $^{99m}$Tc or $^{188}$Re may a be repeatedly separated from the parent-daughter mixture using a solvent extraction method or a chromatographic method. The chromatographic method is more easily used than other methods because it needs a small device, is easily operated, and is less limited by temporal constraints. The chromatographic extraction system of $^{99m}$Tc or $^{188}$Re is referred to as a "$^{99}$Mo/$^{99m}$Tc generator" or "$^{188}$W/$^{188}$Re generator". These generators facilitate the extraction of $^{99m}$Tc or $^{188}$Re in hospitals, thanks to convenience and portability, and thus have been generalized in the field of nuclear medicine throughout the world.

Most $^{99m}$Tc generators that are presently commercially available utilize $^{99}$Mo produced through the fission of highly enriched $^{235}$U, and such fission $^{99}$Mo has extremely high specific activity, and may thus be adsorbed on a small alumina column (1~1.5 g of alumina). However, the fission of $^{235}$U is disadvantageous because gases and solid radioactive materials are produced in large amounts, undesirably causing waste disposal problems which are burdensome and incur high costs.

Among the many methods for extracting $^{99}$Mo from various target materials irradiated in an atomic reactor, U.S. Pat. No. 5,910,971 discloses a method and system for generating $^{99}$Mo in the uranyl sulfate nuclear fuel of a homogeneous solution nuclear reactor. In this disclosure, the nuclear fuel containing $^{99}$Mo is passed through an organic adsorbent for extracting $^{99}$Mo to thus recover $^{99}$Mo along a closed-loop path. U.S. Pat. No. 5,962,597 discloses a specific organic adsorbent for extracting $^{99}$Mo from the solution nuclear reactor mentioned in U.S. Pat. No. 5,910,971.

Korean Patent Application No. 2002-7007625 discloses an inorganic adsorbent for effectively and selectively extracting $^{99}$Mo from an irradiated uranium solution. The adsorbent has high radiation resistance, permitting its use in the high radiation zone of a nuclear reactor. This facilitates a closed cycle extraction process that maintains the uranium concentration of the nuclear fuel through many $^{99}$Mo extraction cycles while minimizing radioactive waste disposal problems.

U.S. Pat. No. 4,280,053 discloses a $^{99m}$TC generator containing zirconium molybdate (ZrOMoO$_4$) gel produced from $^{99}$Mo. In this disclosure, the gel is prepared by dissolving $^{99}$Mo in a slight excess of aqueous ammonia or sodium hydroxide solution. Specifically, an acid is added to adjust the pH to 1.5~7, and the produced solution is added to the stirred aqueous zirconium solution to thus form a molybdate precipitate, which is then collected through filtration or liquid distillation, dried in air, and pulverized to a size suitable for use in the generator, thus obtaining zirconium molybdate.

However, because the method of preparing the zirconium molybdate gel includes a plurality of steps of forming the slurry, adjusting the pH, filtering the slurry, conducting washing and drying, and crushing the resultant precipitate to a preferred particle size, it is technically difficult to produce high-quality radioactive zirconium molybdate gel on a commercial scale through so many steps, and the method is thus undesirable.

Further, $^{98}$Mo may be irradiated with neutrons, thereby producing (n,γ) $^{99}$Mo. This reaction merely results in $^{99}$Mo having low specific activity. In the case where a generator is prepared using the same, the use of a column having a large volume is essential. Accordingly, because the volume of an eluent is also increased, only a $^{99m}$Tc solution having a low activity concentration is produced.

Currently, the international supply of fission $^{99}$Mo is mainly dependant on Canada, and thus there is a need to develop alternatives to technetium generators using fission $^{99}$Mo as a feed, in order to realize stable supply and avoid long-distance transport. Because the parent nuclide $^{118}$W for generating $^{188}$Re is not produced by the fission of highly enriched $^{235}$U, the introduction of a generator system using a radioisotope produced by radiating a target material in addition to the fission material onto the nuclear reactor is necessary.

However, in the case where the radioisotope is produced through the irradiation of the target material in addition to the fission material, the production yield, which is in proportion to the square of neutron flux, is greatly decreased under conditions in which the nuclear reactor has low neutron flux. The neutron flux of almost of nuclear reactors in Korea, Europe, and North America is relatively low, within the range from about $2\times10^{14}$ to about $5\times10^{14}$ n/cm$^2$·s, so that $^{99}$Mo or $^{188}$W is obtained in a state having low specific activity. Further, upon the preparation of $^{188}$W, $^{186}$W needs to be subjected to two neutron capture reactions, leading to further decreased yield. In contrast, diagnostic or therapeutic radioactive atoms require high specific activity, and thus, high-performance adsorbents for radioisotope generators are required.

At present, a generator system using an adsorbent having high adsorption capacity for molybdenum has been devised by Kaken Co., Japan. The generator system utilizes a zirconium polymer (PZC) as an adsorbent and (n,γ) molybdenum (having low specific activity) as a $^{99m}$Tc source. However, the manufacture of the generator column using the above material suffers in that molybdenum is prepared in a batch type and the solution should be heated for a long period of time for the batch reaction, and thereby complicated radiations are required, and furthermore, even if the column is manufactured, the operating performance thereof is deteriorated.

SUMMARY OF THE INVENTION

Leading to the present invention, intensive and thorough research into the development of adsorbents having stable physical properties and high adsorption performance, carried out by the present inventors aiming to solve the problems encountered in the related art, resulted in the finding that sulfated alumina and alumina-sulfated zirconia have excellent physical stability, may be loaded in a dry state in a column, and have high adsorption capacity for molybdenum or tungsten, and thus may be used as high-performance adsorbents for radioisotope generators.

Accordingly, the present invention provides an adsorbent having high adsorption capacity for molybdenum or tungsten in a $^{99}$Mo/$^{99m}$Tc generator or a $^{188}$W/$^{188}$Re generator.

In addition, the present invention provides a method of preparing the adsorbent.

According to the present invention, there is provided an adsorbent for an isotope, formed by introducing alumina or alumina-zirconia as a structural backbone of a $^{99}$Mo adsorbent or a $^{188}$W adsorbent with or without a sulfate group.

In addition, according to the present invention, there is provided a method of preparing the adsorbent for an isotope.

DESCRIPTION OF THE PREFERRED EMBODIMENTS

Figure 1:
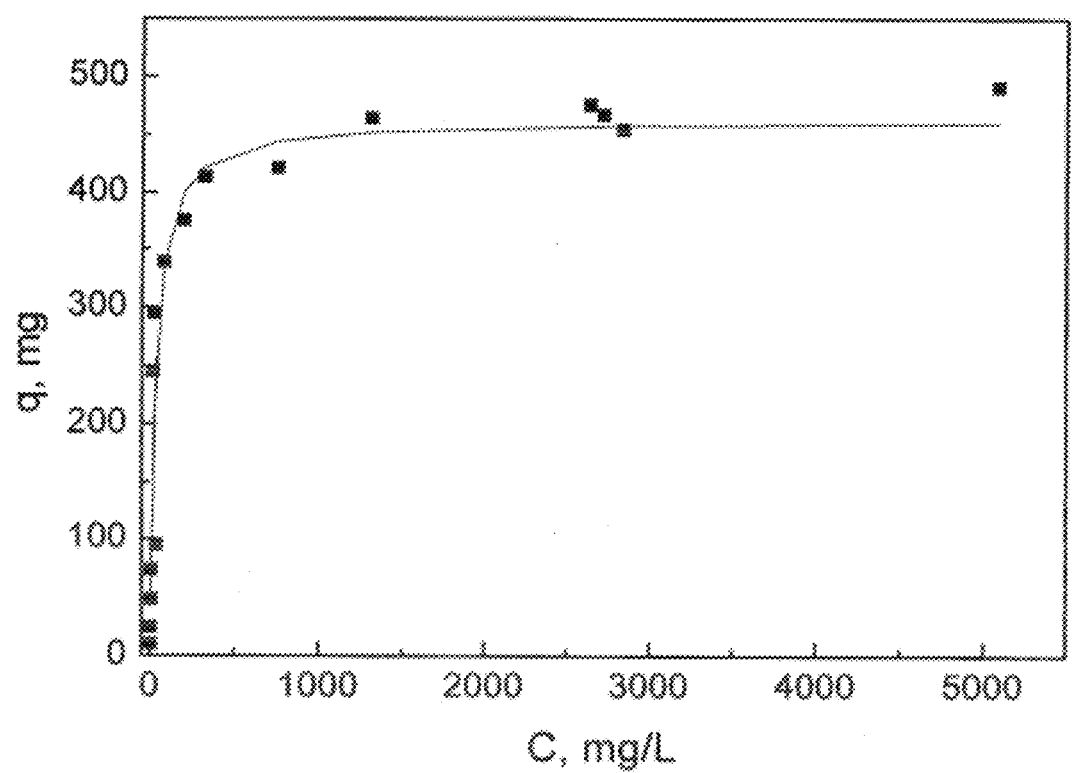
FIG. 1 is a graph illustrating the adsorbed amount of tungsten depending on the change in concentration of a tungsten solution in the adsorbent according to the present invention.

Hereinafter, a detailed description will be given of the present invention.

The present invention provides an adsorbent for an isotope, formed by introducing alumina or alumina-zirconia as a structural backbone of an adsorbent with or without a sulfate group.

In the adsorbent for an isotope according to the present invention, the adsorbent may be provided in the form of a sulfated alumina composite ($Al_2O_3$—$SO_4$). The pore geometry of the sulfated alumina adsorbent may be represented by Formula 1 below:

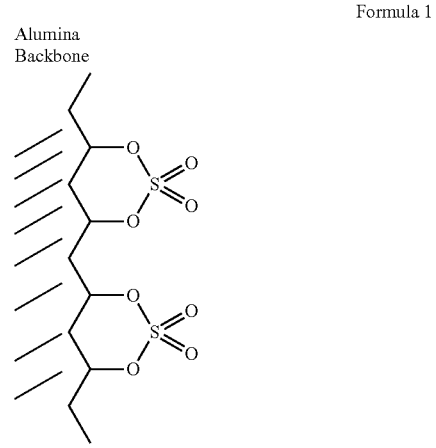 [SMILES: CCC1CC(CC2CC(CC)OS(=O)(=O)O2)OS(=O)(=O)O1]

Formula 1

In addition, in the adsorbent for an isotope according to the present invention, the adsorbent may be provided in the form of an alumina-sulfated zirconia composite ($Al_2O_3$—$ZrO_2$—$SO_4$). The pore geometry of the alumina-sulfated zirconia adsorbent may be represented by Formula 2 below:

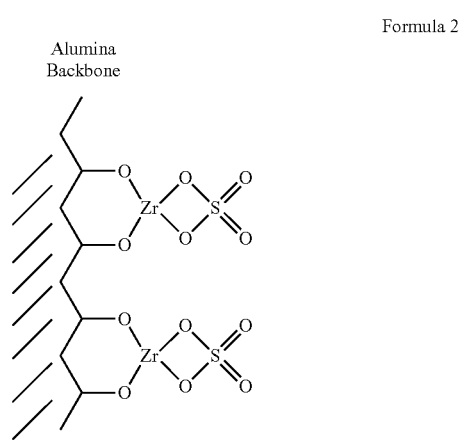

Formula 2

In the adsorbent for an isotope according to the present invention, the particle size of the adsorbent for an isotope is not particularly limited, but is preferably set in the range of 10~500 µm. Even when the particle size is less than 10 µm or exceeds 500 µm, the adsorption performance is not affected. In the case where the particle size falls outside of the above range, the adsorption/desorption of the radioisotope is delayed, or the flow of the solvent in the adsorption column is not efficient.

In the adsorbent for an isotope according to the present invention, the isotope may be molybdenum or tungsten.

The sulfated alumina adsorbent adsorbs molybdate ($MoO_4^{2-}$) or tungstenate ($WO_4^{2-}$) via an ion exchange reaction involving the sulfate group.

Scheme 1

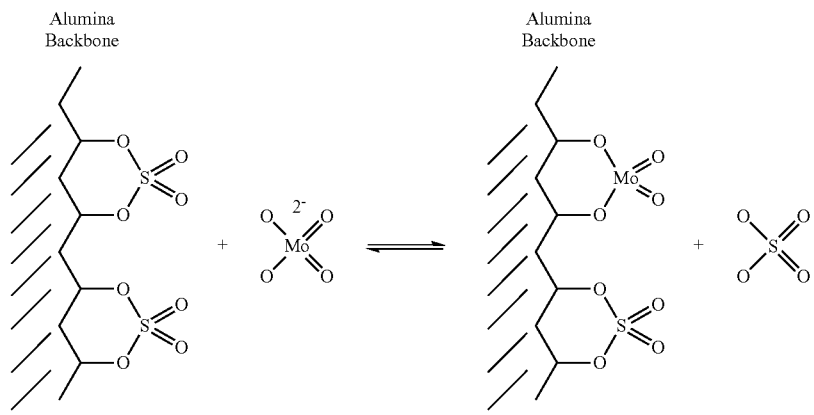

Scheme 2

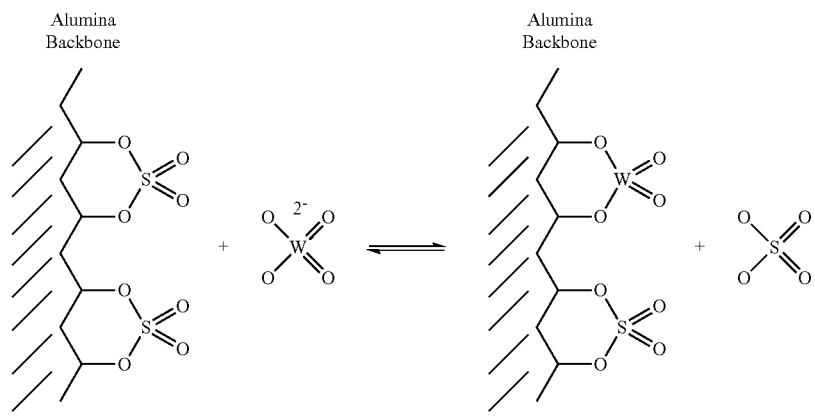

The method of preparing the sulfated alumina adsorbent includes reacting aluminium tri-sec-butoxide (ASB) with anhydrous sulfuric acid in the presence of an alcohol solvent, thus substituting the butoxy group of ASB with a sulfate group (step 1); and adding the reaction solution of step 1 with hydrochloric acid for hydrolysis, aging the solution at room temperature for a predetermined period of time, and drying it at an elevated temperature, thus forming a gel (step 2).

Specifically, step 1 is a process of reacting ASB with anhydrous sulfuric acid in the presence of an alcohol solvent, thus substituting the butoxy group of ASB with the sulfate group.

Examples of the alcohol solvent include alkyl alcohol, aryl alcohol, and mixtures thereof, and the alcohol solvent is preferably used in an amount of 1~10 mol based on 1 mol of ASB.

Subsequently, 0.01~5 mol of anhydrous sulfuric acid is added, after which the solution is stirred for a time period ranging from about 10 min to about 48 hours, thus preparing a reaction solution in which the butoxy group of ASB is substituted with the sulfate group.

Thereafter, step 2 is a process of adding the reaction solution of step 1 with hydrochloric acid, thus hydrolyzing it, aging the solution at room temperature for a predetermined period of time, and drying it at an elevated temperature, thus forming a gel.

The hydrochloric acid for hydrolysis is preferably combined with water and ethanol, and the hydrochloric acid, water, and ethanol are preferably combined in amounts of 0.001~1 mol, 0.1~30 mol, and 0.001~100 mol, respectively.

The solution added with hydrochloric acid, water and ethanol is aged at room temperature, and dried at an elevated temperature in an oven, thus forming a gel. As such, the aging is conducted for 1~72 hours, and the drying is conducted under conditions of 50~300° C. and 1~72 hours.

The gel thus formed is pulverized using a mortar and pestle and is then sieved, thus obtaining gel particles having a predetermined particle size, preferably 10~500 μm. Also, washing the gel particles with an organic solvent, including alcohol or acetone, and drying them may be additionally conducted, thereby obtaining pure gel particles.

The adsorbent particles thus obtained may be stored in a sealed bottle for extended use.

Also, the alumina-sulfated zirconia adsorbent adsorbs molybdate ($MoO_4^{2-}$) or tungstate ($WO_4^{2-}$) via an ion exchange reaction involving sulfated zirconia.

Scheme 3

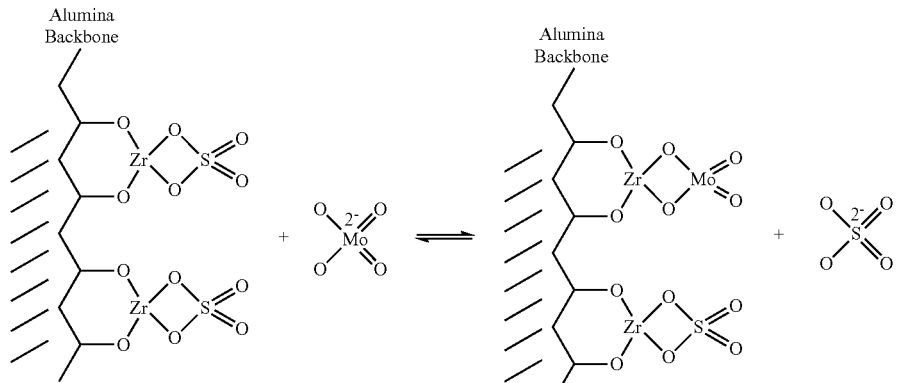

Scheme 4

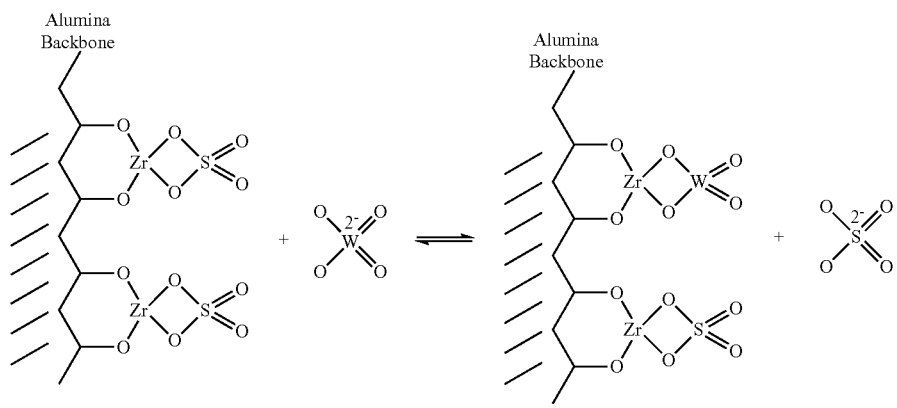

The method of preparing the alumina-sulfated zirconia includes adding ASB dissolved in an alcohol solvent with hydrochloric acid for hyrolysis, thus substituting the butoxy group thereof with a hydroxyl group (step 1); reacting zirconium (IV) propoxide with anhydrous sulfuric acid in the presence of an alcohol solvent, thus preparing sulfated zirconium (step 2); and mixing the reaction solution of step 1 with the reaction solution of step 2, aging the mixture at room temperature for a predetermined period of time, and drying it at an elevated temperature, thus forming a gel (step 3).

Specifically, step 1 is a process of adding ASB dissolved in an alcohol solvent with hydrochloric acid to thus hydrolyze the ASB so that the butoxy group thereof is substituted with a hydroxyl group.

Examples of the alcohol solvent include alkyl alcohol, aryl alcohol, and mixtures thereof, and the alcohol solvent is used in an amount of 1~10 mol based on 1 mol of ASB.

The hydrochloric acid for hydrolysis is combined with water and ethanol, and the hydrochloric acid, water, and ethanol are preferably combined in amounts of 0.001~1 mol, 0.1~30 mol, and 0.001~100 mol, respectively.

Thereafter, step 2 is a process of reacting zirconium (IV) propoxide with anhydrous sulfuric acid in the presence of an alcohol solvent, thus preparing sulfated zirconium.

Examples of the alcohol solvent include alkyl alcohol, aryl alcohol, and mixtures thereof, and the alcohol solvent is preferably used in an amount of 1~10 mol based on 1 mol of zirconium (IV) propoxide.

The anhydrous sulfuric acid is preferably added in an amount of 0.001~30 mol.

Thereafter, step 3 is a process of mixing the reaction solution of step 1 with the reaction solution of step 2, aging the mixture at room temperature for a predetermined period of time, and drying it at an elevated temperature, thus forming a gel.

The aging is conducted for 12-72 hours, and the drying is conducted under conditions of 50~200° C. and 12~72 hours.

The gel thus dried is pulverized using a mortar and pestle and is then sieved, thus obtaining gel particles having a predetermined particle size, preferably 10-500 μm.

The adsorbent particles thus obtained may be stored in a sealed bottle for extended use.

In addition, the present invention provides an isotope generator using the above adsorbent.

The adsorbent composed of sulfated alumina or alumina-sulfated zirconia prepared through the above method has adsorption capacity superior to that of conventional adsorbents (Tables 1 and 2), and is loaded in an adsorption column for adsorbing radioisotope $^{99}$Mo or $^{188}$W, and can thus be efficiently used for a radioisotope generator extracting $^{99m}$Tc or $^{188}$Re.

In the $^{188}$Re generator according to a preferred embodiment of the present invention, in the case where the adsorption capacity of the adsorbent is about 450 mg/g, because specific activity of $^{188}$W is typically 3~6 mCi/mg, a generator column for adsorbing $^{188}$W of 1 Ci needs a volume for accommodating only about 0.2~0.4 g of the adsorbent therein. Thus, the column of the radioisotope generator using the adsorbent of the present invention may be manufactured to be smaller than commercial columns. For example, the size of the column of the invention may be 1/30~1/10 of the size of commercial columns. The small isotope generator is manufactured in a manner such that the bottom of a pyrex column having an internal diameter of 0.9 cm, a length of 6 cm and a thickness of 1.5 mm is capped with a silicone rubber plug having a thickness of 0.95 cm and a length of 0.7 cm, after which a glass fiber filter, 1 g of alumina, 0.7 g of the adsorbent of the present invention, and 0.2 g of glass beads are sequentially loaded on the bottom of the column, and then the top of the column is capped with a silicone rubber plug having a thickness of 0.95 cm and a length of 0.7 cm, and further, syringe needles are mounted to the top and bottom of the column to adsorb $^{188}$W and extract $^{188}$Re. The small isotope generator is simple and portable, and using an eluent (0.9% physiological saline) in a small amount of 5 ml or less, 80~90% or more of $^{188}$Re can be recovered from $^{188}$W, leading to an enrichment effect tens of times that of commercial columns. Thereby, there is no need to additionally enrich $^{188}$Re. Upon use in hospitals, the above column eliminates conventional burdensome problems in which a large amount of solution must be controlled, and manifests efficiency equal to that of a conventional isotope generator, and is thus useful for the production of $^{188}$Re for radiotherapy.

A better understanding of the present invention may be obtained in light of the following examples, which are set forth to illustrate, but are not to be construed to limit the present invention.

Example 1

Preparation of Sulfated Alumina 1

In a vessel, 7.64 ml of ASB was dissolved in 15 ml of octanol, slowly added with 0.58 ml of anhydrous sulfuric acid with stirring for 10 min, and was then reacted for 2 hours. The solution thus obtained was slowly added with a solution comprising 0.65 ml of 0.14 M hydrochloric acid and 1.94 ml of ethanol, allowed to stand at room temperature for 24 hours, washed with acetone and ethanol in turn, and dried at 90° C. for 24 hours, thus obtaining a ceramic material composed of milk-white or light brown particles. The material thus obtained was dried, powdered using a mortar and pestle, boiled along with acetone, dried at 80° C. for 24 hours, and then stored in a sealed state.

Example 2

Preparation of Sulfated Alumina 2

In a vessel, 7.64 ml of ASB was dissolved in a mixture comprising 5 ml of ethanol and 10 ml of octanol, slowly added with 0.58 ml of anhydrous sulfuric acid with stirring for 10 min, and then reacted for 20 min. In another vessel, 0.65 ml of 0.14 M hydrochloric acid was added to 1.94 ml of ethanol and then stirred. Thereafter, the reacted ASB solution was slowly added with the solution comprising hydrochloric acid and ethanol, allowed to stand at room temperature for 24 hours, and then dried at 90° C. for 24 hours, thus obtaining a ceramic material composed of milk-white or light brown particles. The material thus obtained was powdered using a mortar and pestle, washed with acetone and ethanol in turn, dried at 90° C. for 24 hours, and then stored in a sealed state.

Example 3

Preparation of Sulfated Alumina 3

In a vessel, 7.94 ml of ASB was dissolved in 4.5 ml of isobutanol, slowly added with 4.5 ml of ethanol with stirring for 10 min, slowly added with 0.58 ml of anhydrous sulfuric acid with stirring for 1 hour, and then reacted for 1 hour. In another vessel, 0.54 ml of 0.14 M hydrochloric acid was added to 1.62 ml of ethanol and then stirred. Thereafter, the reacted ASB solution was slowly added with the solution comprising hydrochloric acid and ethanol, allowed to stand at room temperature for 24 hours, and dried under conditions of 80° C. for 24 hours, 130° C. for 24 hours, and 150° C. for 24 hours, thus obtaining a ceramic material composed of milk-white or light brown particles. The material thus obtained was powdered using a mortar and pestle, washed with acetone, boiled with acetone, dried at 80° C. for 24 hours, and then stored in a sealed state.

Example 4

Preparation of Sulfated Alumina 4

In a vessel, 15.88 ml of ASB was dissolved in a mixture comprising 10 ml of ethanol and 20 ml of octanol, slowly added with 1.16 ml of anhydrous sulfuric acid with stirring for 30 min, and then reacted for 1 hour. In another vessel, 1.08 ml of 0.14 M hydrochloric acid was added to 3.24 ml of ethanol and then stirred. Thereafter, subsequent procedures were conducted in the same manner as in Example 3, thus obtaining a ceramic material composed of milk-white or light brown particles.

Example 5

Preparation of Sulfated Alumina 5

In a vessel, 7.94 ml of ASB was dissolved in 12 ml of isobutanol, stirred for 10 min, added with 3 mg of ethanol, slowly added with 0.65 ml of anhydrous sulfuric acid with stirring for 10 min, and then reacted for 1.5 hours. In another vessel, 0.54 ml of 0.14 M hydrochloric acid was added to 1.62 ml of ethanol and then stirred to obtain a homogeneous mixture. Thereafter, the reacted ASB solution was slowly added with the solution comprising hydrochloric acid and ethanol, allowed to stand at room temperature for 24 hours, and dried under conditions of 80° C. for 24 hours and 130° C. for 8 hours, thus obtaining a ceramic material composed of milk-white or light brown particles. The material thus obtained was powdered using a mortar and pestle, and was then stored in a sealed state.

Example 6

Preparation of Alumina-Sulfated Zirconia 1

(1) Solution 1: This solution was prepared in a manner such that, in a vessel, 7.64 in of ASB was dissolved in 17.5 ml of ethanol, and was then added with 0.27 ml of 0.14 M hydrochloric acid with stirring for 30 min.

(2) Solution 2: This solution was prepared in a manner such that 4.64 ml of zirconium (IV) propoxide was added to 8.75 ml of ethanol, slowly added with 0.42 ml of anhydrous sulfuric acid, and then reacted for 30 min.

(3) The solution 1 was slowly added with the solution 2, reacted for 30 min, added with 0.81 me of 0.14 M hydrochloric acid, allowed to stand at room temperature for 24 hours, and dried at 80° C. for 24 hours, thus obtaining a ceramic material composed of white or milk-white particles. The material thus obtained was powdered using a mortar and pestle, and was then stored in a sealed state.

Example 7

Preparation of Alumina-Sulfated Zirconia 2

(1) Solution 1: This solution was prepared in a manner such that, in a vessel, 7.64 in of ASB was dissolved in 17.5 ml of ethanol, stirred, for 1 hour, added with 0.27 mg of 0.14 M hydrochloric acid, and stirred for 1 hour.

(2) Solution 2: This solution was prepared in a manner such that 4.64 ml of zirconium (IV) propoxide was slowly added with 0.42 ml of anhydrous sulfuric acid, reacted for 1 hour, and added with 8.75 ml of ethanol.

(3) The solution 1 was slowly added with the solution 2, after which the same steps as in Example 6 were conducted, with the exception that the reaction was conducted for 1 hour, thus obtaining a ceramic material composed of white or milk-white particles. The material thus obtained was powdered using a mortar and pestle, and was then stored in a sealed state.

Example 8

Preparation of Alumina-Sulfated Zirconia 3

(1) Solution 1: This solution was prepared in the same manner as in Example 7.

(2) Solution 2: This solution was prepared in the same manner as in Example 6, with the exception that 0.84 in of anhydrous sulfuric acid was added.

(3) The same steps as in Example 7 were conducted, thus obtaining a ceramic material composed of white or milk-white particles. The material thus obtained was powdered using a mortar and pestle, and was then stored in a sealed state.

Example 9

Preparation of Alumina-Sulfated Zirconia 4

(1) Solution 1: This solution was prepared in the same manner as in Example 7.

(2) Solution 2: This solution was prepared in the same manner as in Example 6, with the exception that 1.68 ml of anhydrous sulfuric acid was added.

(3) The same steps as in Example 7 were conducted with the exception that drying was conducted under conditions of 80° C. for 24 hours and 250° C. for 25 min, thus obtaining a ceramic material composed of white or milk-white particles. The material thus obtained was powdered using a mortar and pestle, and was then stored in a sealed state.

Example 10

Preparation of Alumina-Sulfated Zirconia 5

(1) Solution 1: This solution was prepared in the same manner as in Example 7.

(2) Solution 2: This solution was prepared in a manner such that 0.172 g of yttrium nitrate was dissolved in 8.75 ml of ethanol, added with 4.64 ml of zirconium (IV) propoxide, slowly added with 0.84 ml of anhydrous sulfuric acid, and reacted for 1 hour.

(3) The same steps as in Example 7 were conducted, thus obtaining a ceramic material composed of white or milk-white particles. The material thus obtained was powdered using a mortar and pestle, and was then stored in a sealed state.

Example 11

Preparation of $^{188}$W/$^{188}$Re Generator

Figure 2:
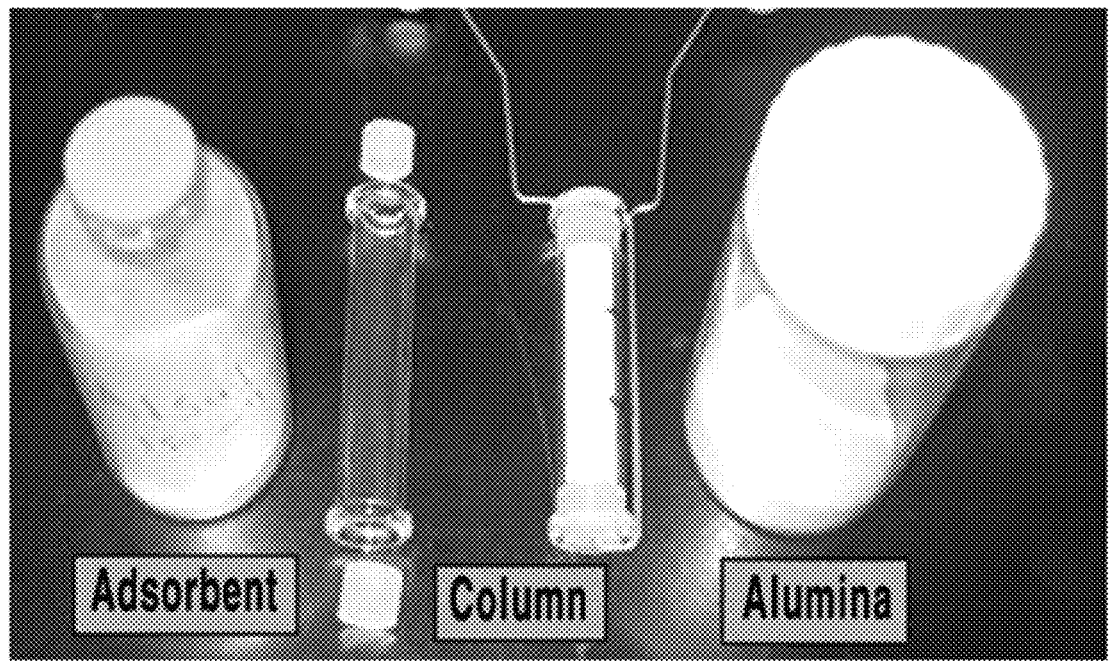
FIG. 2 presents the component of the $^{188}$W/$^{188}$Re generator system of the present invention including Adsorbent, Column and Alumina.

The bottom of a pyrex column having an internal diameter of 0.9 cm, a length of 6 cm and a thickness of 1.5 mm was capped with a silicone rubber plug having a thickness of 0.95 cm and a length of 0.7 cm, after which a glass fiber filter, 1 g of alumina, 0.7 g of the inventive adsorbent, and 0.2 g of glass beads were sequentially loaded on the bottom of the column, and then the top of the column was capped with a silicone rubber plug having a thickness of 0.95 cm and a length of 0.7 cm. Further, syringe needles were mounted to the top and bottom of the column to adsorb $^{188}$W and extract $^{188}$Re, thus manufacturing the generator system shown in FIG. 2.

Experimental Example 1

Molybdenum ($^{99}$Mo) Adsorption Capacity Experiment

In order to evaluate the adsorption capacity of the adsorbent of the present invention for molybdenum, which is the parent nuclide of technetium, the following experiment was conducted.

<1-1> Molybdenum ($^{99}$Mo) Adsorption Capacity of Sulfated Alumina ($Al_2O_3$—$SO_4$)

0.5 g of each of the adsorbents of Examples 1-5 and a conventional alumina adsorbent was added to 25 ml of a molybdenum (Mo) solution having a pH of 10.5 and a concentration of 10,500 mg/l, and was then reacted at room temperature for 2 hours with stirring, after which the change in the amount of molybdenum in the above solution was measured using a multichannel analyzer (HPGe-γ-ray detector, EG & G Ortec, Model # GEM 10175). Before the molybdenum solution was reacted with the adsorbent, it was added with radioisotope $^{99}$Mo, acting as a tracer, so that the concentration thereof was 0.25 μCi/ml. The change in the radioactivity of the aqueous solution was measured, and the adsorbed amount of molybdenum was calculated. The results are shown in Table 1 below.

TABLE 1

| | Adsorbed Amount (mg/g) |
|---|---|
| Ex. 1 | 208 |
| Ex. 2 | 216 |
| Ex. 3 | 218 |
| Ex. 4 | 170 |
| Ex. 5 | 240 |
| Alumina | <5 |

As is apparent from Table 1, the sulfated alumina adsorbent of the present invention showed an adsorption rate about 40 times as high as that of the conventional alumina adsorbent.

<1-2> $^{99}$Mo Adsorption Capacity of Alumina-Sulfated Zirconia ($Al_2O_3$—$ZrO_2$—$SO_4$)

The adsorption capacity was measured in the same manner as in <1-1>, with the exception that the alumina-sulfated zirconia adsorbent of Examples 6-10 was used, instead of the sulfated alumina adsorbent. The results are shown in Table 2 below.

TABLE 2

| | Adsorbed Amount (mg/g) |
|---|---|
| Ex. 6 | 109 |
| Ex. 7 | 93 |
| Ex. 8 | 231 |
| Ex. 9 | 211 |
| Ex. 10 | 217 |
| Alumina | <5 |

As is apparent from Table 2, the alumina-sulfated zirconia adsorbent of the present invention showed an adsorption rate about 20~40 times as high as that of the conventional alumina adsorbent. Thus, the adsorbent according to the present invention can be useful as an adsorbent for $^{99}Mo/^{99m}Tc$ generators, which are medical diagnostic radioisotope generators.

Experimental Example 2

Technetium ($^{99m}Tc$) Elution Experiment

In order to evaluate the elution efficiency of the adsorbent of the present invention for technetium, the following experiments were conducted.

<2-1> Technetium ($^{99m}Tc$) Elution of Sulfated Alumina ($Al_2O_3$—$SO_4$)

A column having an internal diameter of 1 cm was packed such that 2 g of the sulfated alumina of Example 5 was disposed between 0.2 g of each of upper and lower beds of glass beads, after which 50 ml of a molybdenum (Mo) solution having a pH of 10.5 and a concentration of 10,500 mg/l was passed at a flow rate of 1 ml/min through the column, and then the adsorbed amount of molybdenum was measured using a multichannel analyzer (HPGe-γ-ray detector, EG & G Ortec, Model # GEM 10175). As a result, the adsorbed amount thereof was determined to be 392 mg/g.

After the adsorption, the amount of technetium eluted was measured and the elution efficiency was calculated. In this case as well, a multichannel analyzer was used.

As the result, the technetium elution efficiency of the sulfated alumina was about 60-80%.

<2-2> Technetium ($^{99m}Tc$) Elution of Alumina-Sulfated Zirconia ($Al_2O_3$—$ZrO_2$—$SO_4$)

The adsorption capacity and elution efficiency were measured in the same manner as in <2-1>, with the exception that the alumina-sulfated zirconia adsorbent of Example 10 was used, instead of the sulfated alumina adsorbent.

As the results, the adsorption capacity of the alumina-sulfated zirconia adsorbent was 195 mg/g, and the technetium elution efficiency of the alumina-sulfated zirconia adsorbent was about 60-85%.

Experimental Example 3

Tungsten ($^{188}W$) Adsorption Capacity Experiment 1

In order to evaluate the adsorption capacity of the adsorbent of the present invention for tungsten ($^{188}W$), which is the parent nuclide of rhenium ($^{188}Re$), the following experiment was conducted.

0.5 g of the sulfated alumina adsorbent of Example 5 was added to 25 ml of a tungstate ($WO_4^{2-}$) solution having a pH of 10.5 and a concentration of 25,000 mg/f, and was then reacted at room temperature for 2 hours with stirring, after which the change in the amount of tungsten in the above solution was measured using a multichannel analyzer (HPGe-γ-ray detector, EG & G Ortec, Model # GEM 10175). Before the tungstate solution was reacted with the adsorbent, it was added with radioisotope $^{188}W$ acting as a tracer, so that the concentration thereof was 0.25 μCi/ml.

As a result, the amount of tungsten ($^{188}W$) adsorbed by the alumina was less than 5 mg/g, whereas the amount of tungsten (W) adsorbed by the sulfated alumina adsorbent was 480 mg/g, from which it can be seen that the sulfated alumina adsorbent exhibited adsorption capacity about 80 times higher than that of the conventional alumina adsorbent.

Hence, the adsorbent of the present invention can be efficiently used as a novel adsorbent for $^{188}W/^{188}Re$ generators, which are therapeutic radioisotope generators.

Experimental Example 4

Tungsten ($^{188}W$) Adsorption Capacity Experiment 2

In order to evaluate the adsorption capacity of the adsorbent of the present invention depending on the concentration of the tungsten solution, the following experiment was conducted.

An appropriate amount of $^{186}WO_3$ was added to 1.0 M NaOH solution, and was then gradually heated to dissolve it, after which the pH of the resultant solution Was adjusted to 10. Subsequently, 20 ml of each of tungsten solutions having various concentrations in the range of 100~10,000 mg/l and the pH adjusted to 10.5, and 0.2 g of the adsorbent of Example 5 were subjected to batch reaction at room temperature for 3 hours, after which the adsorbed amount of tungsten was measured at respective concentrations. Specifically, before the initiation of the reaction, in order to measure the adsorbed amount of tungsten, 1 μCi/ml $^{188}W$ was added to the tungsten solution, and the amounts of $^{188}W$ in the tungsten solution before and after the reaction were compared, thus calculating the adsorbed amount thereof. The measurement of $^{188}W$ was carried out using a multichannel analyzer (HPGe-γ-ray detector, EG & G Ortec, Model # GEM 10175).

The results are shown in FIG. 1.

As shown in FIG. 1, the amount of $^{188}W$ adsorbed by the adsorbent of the present invention depending on the change in the concentration of the tungsten solution is represented by an adsorption isotherm curve of Langmuir Type-I. The maximum adsorbed amount calculated on the basis of a nonlinear coefficient method was 462.7±1.5 mg/g, and the actual adsorbed amount in the 5,000 mg/l solution was 490 mg/g, which is considered very high.

Experimental Example 5

Demonstration Experiment of $^{188}W/^{188}Re$ Generator Column

In order to evaluate the performance of a small $^{188}W/^{188}Re$ generator using the adsorbent of the present invention, the following experiment was conducted.

Crude $^{188}W$ for a 1 Ci $^{188}W$ solution was purchased from RIAR (Research Institute of Atomic Reactors) through TENEX Co., Russia. The imported crude solution is specified as follows.

$^{188}W$ Solution Volume: 3.36 ml
$^{188}W$ Radioactivity: 1.27 Ci
Specific Activity: 7.56 Ci/g
$^{187}W/^{188}W$: 12%
Concentration of Sodium Hydroxide: 0.2 N
Total Tungsten Concentration: 50 mg/ml
(1) Measurement of $^{188}W$ Adsorption Rate The imported $^{188}$W solution was added with an HCl solution to adjust the pH thereof to about 6, and was then diluted to a total volume of 5 ml, thus preparing a loading solution. Then, the $^{188}$W solution was introduced into the $^{188}$W/$^{188}$Re generator column of Example 11 at a flow rate of 1 ml/min using a peristaltic pump, after which the solution discharged from the column was collected into a glass bottle, and the radioactivity thereof was measured. As the result, 99% or more of $^{188}$W was adsorbed on the inner wall of the column, from which the excellent performance of the adsorbent of the present invention was confirmed.

(2) Measurement of $^{188}$Re Recovery Rate 10 ml of physiological saline was passed through the column several times to remove $^{188}$W, which was not adsorbed, from the column, and the removal of $^{188}$W was confirmed. Thereafter, physiological saline was added at intervals of every 4~7 days for 3 months, thus extracting $^{188}$Re, after which the recovery rate of $^{188}$Re and the residual amount of $^{188}$W in the $^{188}$Re solution were measured. The results are shown in FIG. 3.

Figure 3:
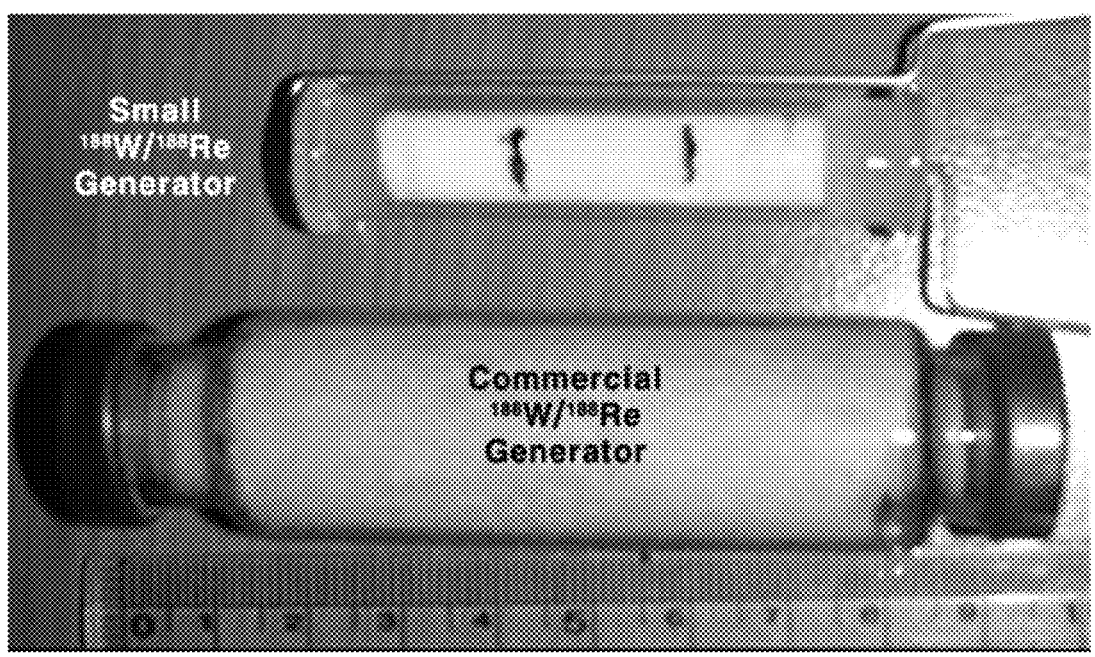
FIG. 3 presents $^{188}$W/$^{188}$generator of the present invention and a commercial $^{188}$W/$^{188}$generator.

As shown in FIG. 3, the recovery rate of $^{188}$Re was in the range of 75~90%, and was maintained at a level of about 80%, except for $^{188}$Re recovered in the first two experiments. This recovery rate could be seen to be equal to that of presently commercially available generators.

Figure 4:
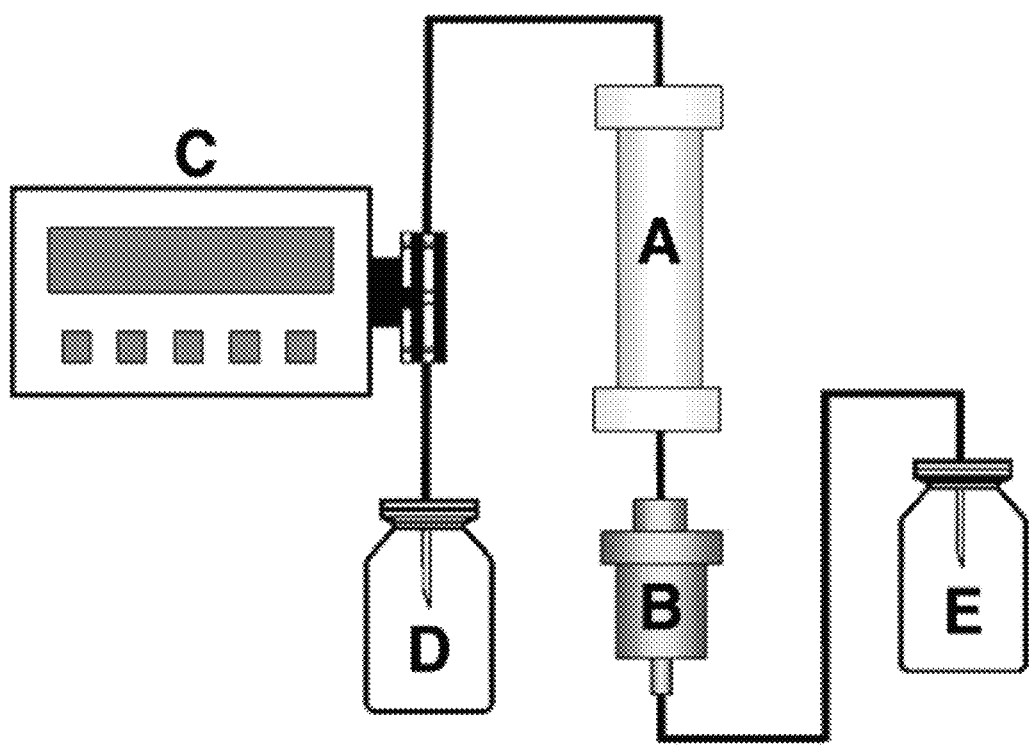
FIG. 4 is a schematic view illustrating a small $^{188}$W/$^{188}$Re generator system using the adsorbent according to the present invention (A: adsorption column, B: silicone rubber plug, C: controller, D: $^{188}$W containing bottle, E: $^{188}$Re-extracting bottle)

FIG. 4 shows the recovered amount of $^{188}$Re relative to the introduced amount of eluent (0.9% physiological saline) in the recovery of $^{188}$Re. As shown in FIG. 4, $^{188}$Re was recovered to a level of 90% or more of the total recovered amount in a volume fraction of 5 ml or less, thus realizing an enrichment effect tens of times that of commercial columns. Therefore, the small $^{188}$W/$^{188}$Re generator using the adsorbent of the present invention could eliminate problems in which a large amount of solution must be controlled for use in hospitals.

In the case of presently commercially available $^{188}$W/$^{188}$Re generators, in the early stage at which the generator is mounted, $^{188}$Re can be used directly after extraction with physiological saline. However, as the extraction frequency is increased, the concentration of $^{188}$Re in the physiological saline is decreased, and thus there are problems in which enrichment is required. In contrast, the small $^{188}$W/$^{188}$Re generator using the adsorbent of the invention obviates the need for such enrichment, and thus can be convenient to prepare $^{188}$Re.

(3) $^{188}$Re Nuclide Purity

In order to determine the radioactivity of $^{188}$W in the extracted $^{188}$Re solution, the radioactivity of $^{188}$Re was sufficiently decayed, and was then measured using a gamma spectrometer. The results are shown in FIG. 3.

As shown in FIG. 3, the mean $^{188}$W/$^{188}$Re ratio of the $^{188}$Re solution was $2 \times 10^{-3}$, which doubles $1 \times 10^{-3}$, which is the standard in pharmacopoeia. This phenomenon is considered to be caused because a considerable amount of non-radioactive tungsten is contained in the column loading solution, and thus the adsorption active layer in the column should be increased in length rather than in volume, but the length of the column is short. Hence, the above problem was solved by installing a tandem column of Sep-pak® packed with acidic alumina, in order to decrease the residual amount of tungsten to a standard level or less. As seen in FIG. 3, from the 11$^{th}$ elution after Sep-pak® was installed, alumina in Sep-pak® was equilibrated with the extraction solution, and thus the recovery rate of $^{188}$Re was returned to 80% or more. The content of $^{188}$W was also confirmed to be maintained at $1 \times 10^{-3}$ or less, which is the standard of pharmacopoeia.

(4) Analysis of Quality of $^{188}$Re Solution

The important factors determining the quality of the extracted $^{188}$Re solution include the $^{188}$W/$^{188}$Re ratio, the aluminum concentration in the $^{188}$Re solution, the radiochemical purity, and the labeling yield of $^{188}$Re and a compound that is labeled therewith.

Aluminum Concentration

The aluminum concentration in the extracted $^{188}$Re solution was measured using an aluminum test kit. As the test kit, TEC-CONTROL ALUMINUM BREAKTHRU KIT (Biodex Medical Systems) was used. 10 mg/l of each of the standard solution and the extracted $^{188}$Re solution was dropped on the kit, and the color and size were compared. The results are shown in FIG. 5.

Figure 5:
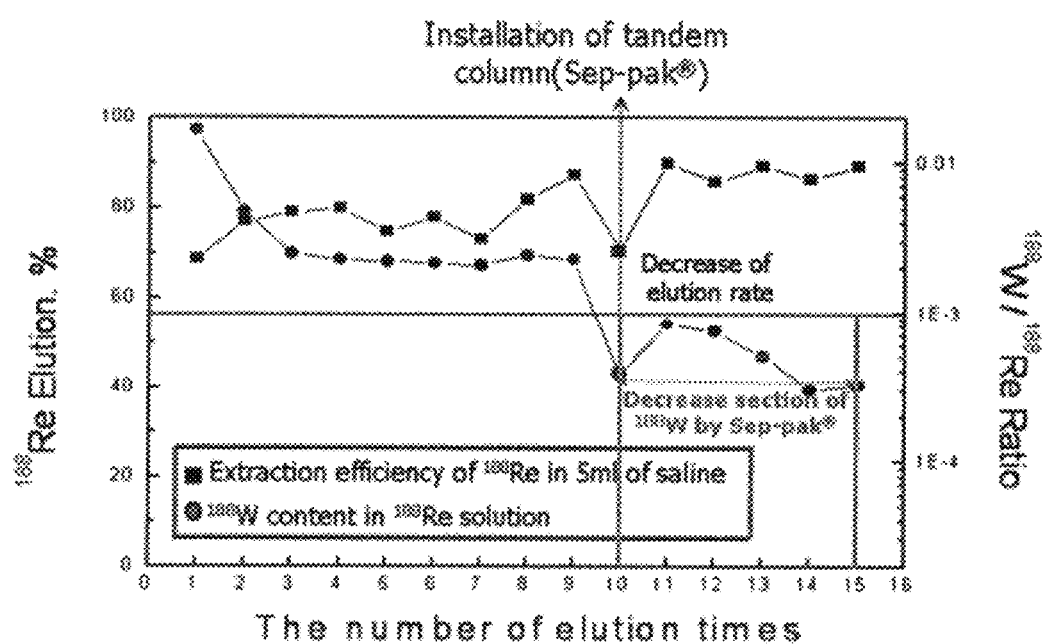
FIG. 5 is a graph illustrating the $^{188}$Re extraction efficiency and the $^{188}$W/$^{188}$Re ratio upon the elution with 5 ml of saline in the small $^{188}$W/$^{188}$Re generator using the adsorbent according to the present invention.

In FIG. 5, T indicates the $^{188}$Re solution and S indicates the standard solution.

From FIG. 5, the aluminum concentration in the extracted $^{188}$Re solution could be seen to be much lower than an allowable value based on the fact that the size of the concentric circle thereof was smaller, compared to the standard solution.

Chemical Purity of $^{188}$Re

The chemical purity of the extracted $^{188}$Re was measured using chromatography. The extracted $^{188}$Re was dropped on Whatmann Paper #4, and was then developed using a developer composed of 75% methanol and 25% pure water. The results are shown in FIG. 6.

Figure 6:
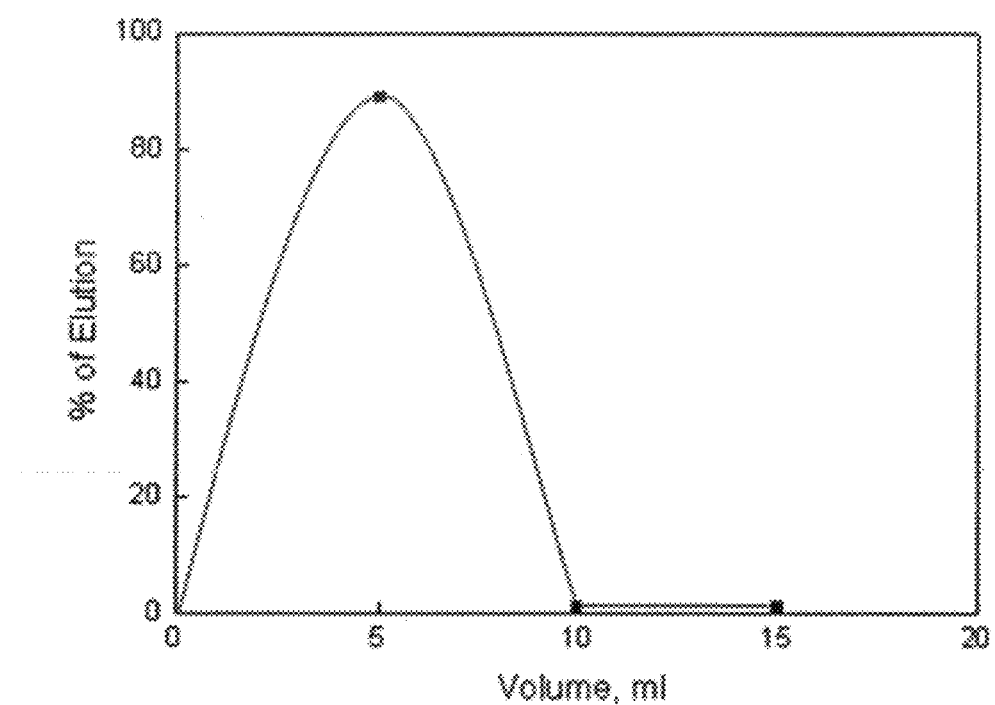
FIG. 6 is a graph illustrating the recovery rate of $^{188}$Re depending on the amount of eluent in the small $^{188}$W/$^{188}$Re generator using the adsorbent according to the present invention.

From FIG. 6, the extracted $^{188}$Re could be seen to have very high purity because 100% $^{188}$Re was exclusively shown.

Further, whether the $^{188}$Re was present in a colloid form (ReO$_2$) was evaluated using ITLC. Specifically, on a silica gel plate for ITLC, the extracted $^{188}$Re solution was dropped, developed using acetone, and analyzed. The results are shown in FIG. 7.

Figure 7:
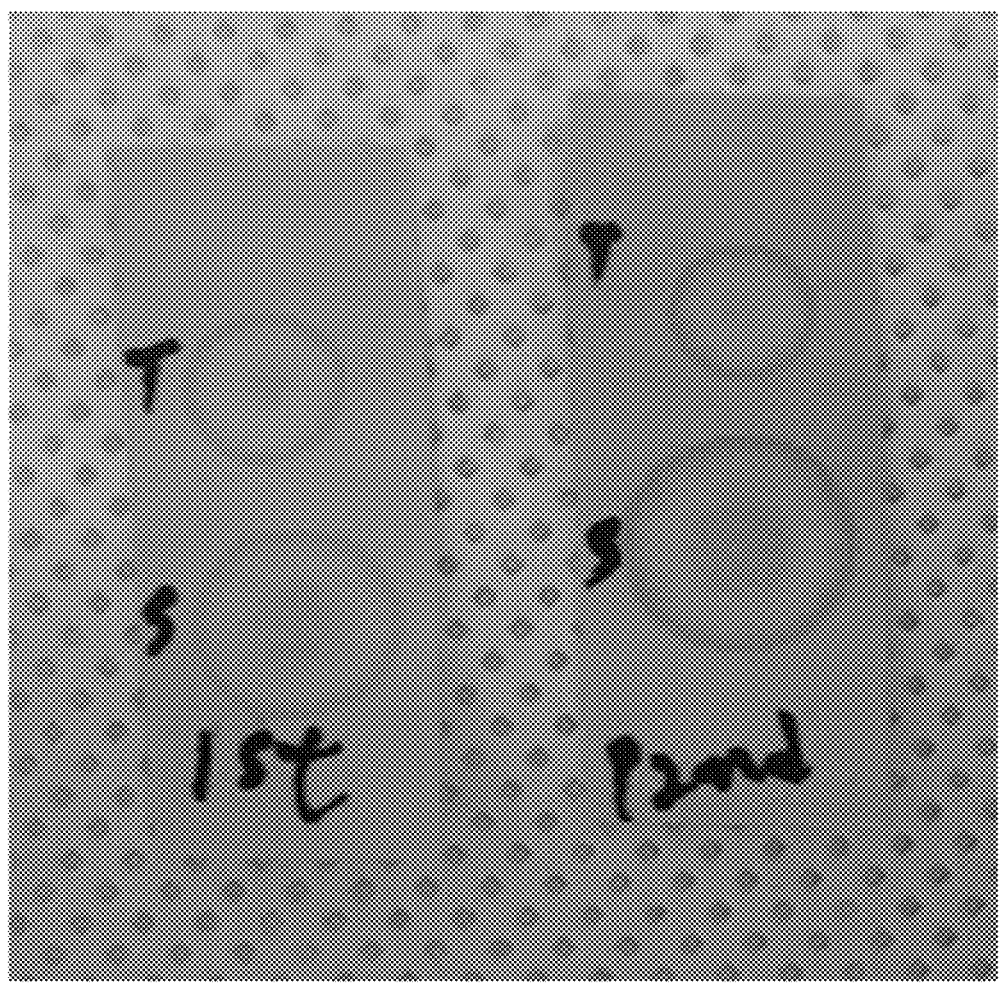
FIG. 7 is a photograph of an aluminum test kit for, showing the aluminum concentration of the $^{188}$Re solution extracted from the small $^{188}$W/$^{188}$Re generator using the adsorbent according to the present invention.

As seen in FIG. 7, in the extracted $^{188}$Re solution, no $^{188}$Re colloid particles were detected.

HEDP Labeling Yield of $^{188}$Re $^{188}$Re-HEDP is mainly used in order to palliate pain from cancer that has spread to the bone marrow. Thus, the labeling yield of extracted $^{188}$Re and HEDP (hydroxyethylene diphosphonate) was measured. Said $^{188}$Re and HEDP were labeled according to the standardized procedure, and the synthesis results thereof were analyzed using ITLC. The analysis results are shown in FIG. 8.

Figure 8:
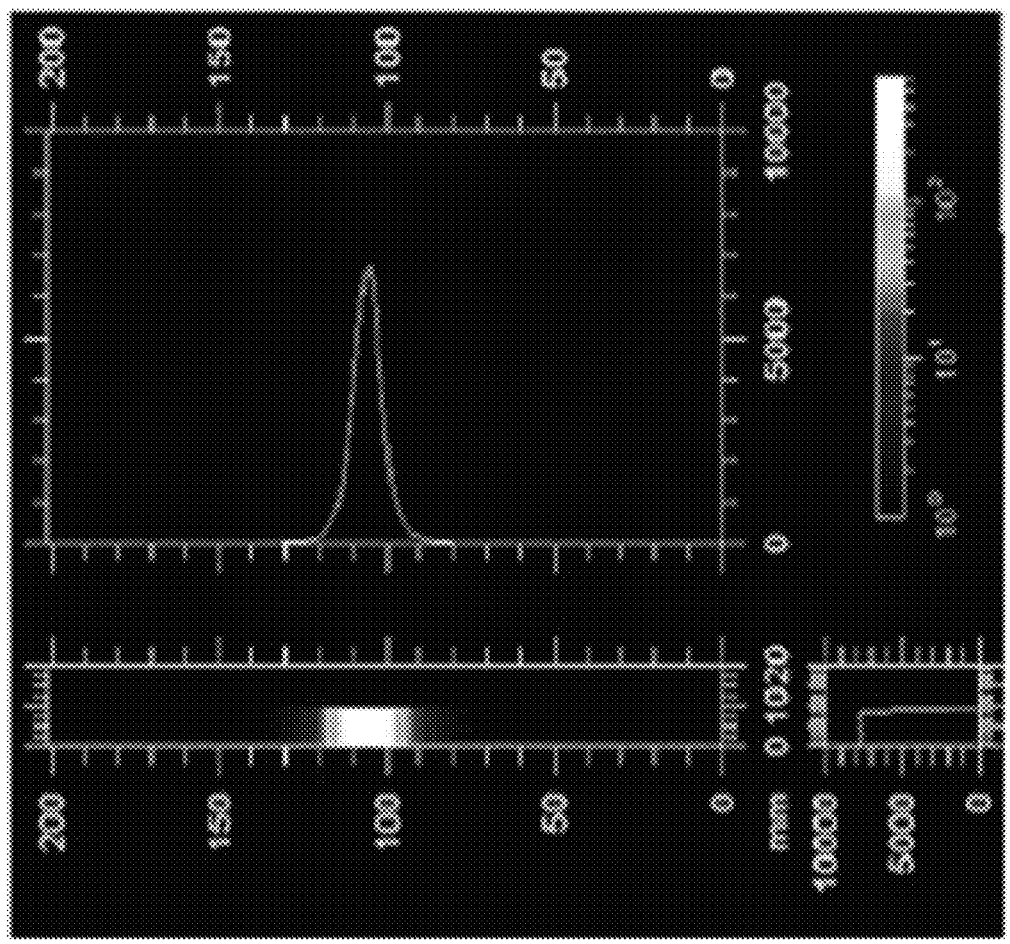
FIG. 8 is a chromatography graph illustrating the purity of the $^{188}$Re solution extracted from the small $^{188}$W/$^{188}$Re generator using the adsorbent according to the present invention.
Figure 9:
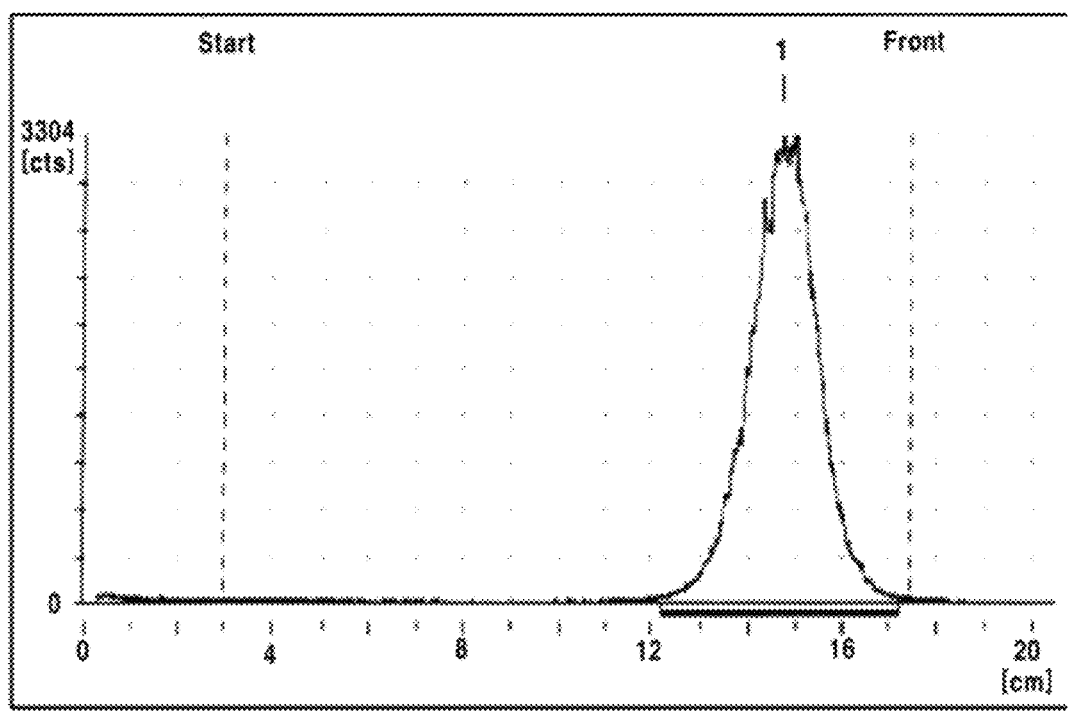
FIG. 9 is an ITLC graph illustrating whether colloid is present or not in the $^{188}$Re solution extracted from the small $^{188}$W/$^{188}$Re generator using the adsorbent according to the present invention.
Figure 10:
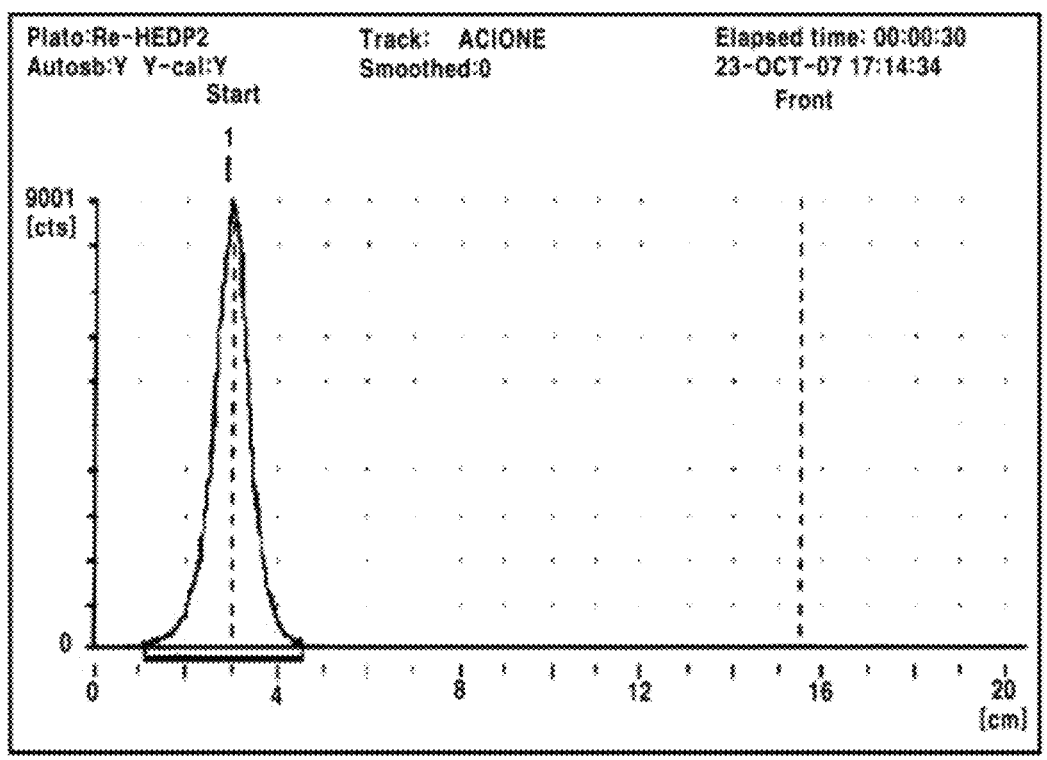
FIG. 10 is an ITLC graph illustrating the HEDP labeling yield of the $^{188}$Re solution extracted from the small $^{188}$W/$^{188}$Re generator using the adsorbent according to the present invention.

As shown in FIG. 8, said $^{188}$Re was confirmed to completely label HEDP.

In this way, $^{188}$Re extracted from the small $^{188}$W/$^{188}$Re generator using the adsorbent of the present invention could be seen to satisfy requirements for pharmaceuticals through the quality analysis. Therefore, the small $^{188}$W/$^{188}$Re generator using the adsorbent of the present invention is advantageous because it has a small size, is convenient to use, is highly efficient, and can extract $^{188}$Re, satisfying requirements for pharmaceuticals, and can thus be effectively applied in fields requiring $^{188}$Re.

As described hereinbefore, the sulfated alumina or alumina-sulfated zirconia according to the present invention exhibits adsorption capacity superior to that of conventional adsorbents, and is stable and is thus loaded in a dry state in an adsorption column, so that the radioisotope $^{99}$Mo or $^{188}$W can be adsorbed. Thus, it is possible to miniaturize the column, and such a miniaturized column is small, convenient to use, and highly efficient, and can extract a radioisotope satisfying requirements for pharmaceuticals, and therefore, can be effectively used for radioisotope generators extracting $^{99m}$Tc or $^{188}$Re.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of generating $^{188}$Re comprising:
   adsorbing $^{188}$W onto an adsorbent; and
   recovering $^{188}$Re,
   wherein the adsorbent comprises a sulfated alumina composite ($Al_2O_3$—$SO_4$).

2. The method of claim 1, wherein the adsorbent is packed in a column.

3. The method of claim 1, wherein the adsorbent is has a particle size of 10-500 μm.

4. The method of claim 1, wherein the $^{188}$W is in a form of tungstate ($^{188}WO_4^{2-}$).

5. A method of claim 1, wherein said $^{188}$Re is formed by decaying of said $^{188}$W adsorbed onto the adsorbent.

6. A method of generating $^{188}$Re comprising:
   introducing a loading solution comprising $^{188}$W into a $^{188}$W/$^{188}$Re generator column accommodating an adsorbent therein; and
   passing through the column with an eluent to recover $^{188}$Re,
   wherein the adsorbent comprises sulfated alumina composite ($Al_2O_3$—$SO_4$).

7. The method of claim 6, wherein the adsorbent is packed in a column.

8. The method of claim 6, wherein the adsorbent is has a particle size of 10-500 μm.

9. The method of claim 6, wherein the $^{188}$W is in a form of tungstate ($^{188}WO_4^{2-}$).

10. A method of claim 6, wherein said $^{188}$Re is formed by decaying of said $^{188}$W adsorbed onto the adsorbent.

11. A method of claim 6, wherein the eluent comprises a physiological saline.

12. A method of claim 6, wherein method further comprises a step of passing through the column with an physiological saline after introducing a loading solution to remove $^{188}$W which is not adsorbed.

* * * * *